United States Patent [19]

Gerson et al.

[11] Patent Number: 5,248,336

[45] Date of Patent: Sep. 28, 1993

[54] SOLID SOLUTIONS OF COPPER PHTHALOCYANINE COMPOUNDS

[75] Inventors: Herman Gerson, New York, N.Y.; Abdul Sattar, Mt. Pleasant, S.C.

[73] Assignee: Miles Inc., Pittsburgh, Pa.

[21] Appl. No.: 787,852

[22] Filed: Nov. 5, 1991

[51] Int. Cl.$^5$ ............................................. C09B 67/50
[52] U.S. Cl. .................................... 106/411; 540/139
[58] Field of Search ............................. 106/410–413

[56] References Cited

U.S. PATENT DOCUMENTS

| | | | |
|---|---|---|---|
| 2,192,704 | 3/1946 | Dahlen et al. | 106/411 |
| 3,160,510 | 4/1950 | Ehrich | 106/288 |
| 3,298,847 | 1/1967 | Hanke et al. | 106/288 |
| 3,607,336 | 9/1971 | Jaffe | 106/288 Q |
| 4,895,949 | 1/1990 | Jaffe et al. | 546/56 |

FOREIGN PATENT DOCUMENTS 791763 12/1980 U.S.S.R. .

OTHER PUBLICATIONS

K. Venkataraman, "The Chemistry of Synthetic Dyes", vol. II (New York: Academic Press, 1952), pp. 1132, 1133.

N. M. Bigelow and M. A. Perkins, "Phthalocyanine Pigments," in The Chemistry of Synthetic Dyes, ed. H. A. Lubs (Malabar, Florida: Robert E. Krieger Publishing Company 1955), pp. 598–599.

*Primary Examiner*—Mark L. Bell
*Assistant Examiner*—Margaret Einsmann
*Attorney, Agent, or Firm*—Joseph C. Gil; Richard E. L. Henderson

[57] ABSTRACT

This invention relates to solid solutions containing (a) about 90 to about 10% by weight of a chlorinated copper phthalocyanine containing about 14 to about 16 atoms of chlorine per molecule and (b) about 10 to about 90% by weight of a copper phthalocyanine containing about 3 to about 4 atoms of chlorine wherein said compositions are characterized by X-ray diffraction patterns that differ from the sum of the X-ray diffraction patterns of the individual components.

7 Claims, 4 Drawing Sheets

SOLID SOLUTIONS OF COPPER PHTHALOCYANINE COMPOUNDS

BACKGROUND OF THE INVENTION

This invention relates to novel solid solutions of copper phthalocyanine compounds, processes for their synthesis, and their use for pigmentation of, for example, fibers, plastics, coatings, and printing inks. In particular, this invention relates to compositions in which tetrachloro copper phthalocyanine and C.I. Pigment Green 7 are mixed under certain conditions with each other to form solid solutions that are quite different from both physical mixtures of such compounds and from the individual compounds themselves.

The term "solid solution" as used herein describes a well recognized physical property of certain solid substances. In a solid solution, the molecules of the components enter into the same crystal lattice, usually (but not always) the crystal lattice characteristic of one of the components. The X-ray pattern of the resulting crystalline solid is characteristic and can be clearly differentiated from the pattern of a physical mixture of the same components in the same proportion. Thus, the X-ray peaks of each component of a physical mixture can be distinguished, whereas a characteristic of a solid solution is the disappearance and shift of many of these peaks.

Solid solutions of other types of pigments have been reported to provide advantageous color properties. For example, U.S. Pat. No. 3,160,510 discloses solid solutions of certain quinacridone pigments having improved tinctorial and lightfastness properties. Suitable methods for preparing solid solutions of quinacridone pigments are described, for example, in U.S. Pat. Nos. 3,160,510, 3,298,847, 3,607,336, and 4,895,949.

Three important properties of the present invention make the new products particularly useful as pigments. First, in contrast to simple physical mixtures wherein the color is usually a direct function of the additive effects of the two components, the new solid solution of the present invention show unexpected and advantageous coloristic properties.

A second valuable property of the invention is an enhancement of lightfastness, which frequently accompanies the formation of solid solution. In physical mixtures of two pigments, the components show their individual behaviors upon exposure to light, often resulting in marked changes of hue as one pigment component fades more than the other. In contrast, however, the solid solutions of the present invention appear to behave as a single substance with respect to hue stability.

Third, the present invention makes it possible to prepare pigments not readily available as single compounds. For example, C.I. Pigment Green 37, described in the Colour Index as a turquoise pigment, is also known as "octochloro copper phthalocyanine," and thus has a chlorine content within the broad range described for solid solutions according to the invention. Octochloro copper phthalocyanine can be prepared by condensing dichlorophthalic anhydride, a difficult to obtain and expensive material. This pigment can also be prepared by direct chlorination of copper phthalocyanine, but the preparative method is expensive and difficult to control. See K. Venkataraman, *The Chemistry of Synthetic Dyes*, Vol. II (New York: Academic Press, 1952), pages 1132, 1133); N. M. Bigelow and M. A. Perkins, "Phthalocyanine Pigments," in *The Chemistry of Synthetic Dyes and Pigments*, ed. H. A. Lubs (Malabar, Florida: Robert E. Krieger Publishing Company, 1955), pages 598–599. Octochloro copper phthalocyanine does not, however, exhibit the advantageous properties observed for the solid solutions of the present invention.

The novel phthalocyanine pigment solid solutions of the present invention, when compared with the corresponding physical mixtures, as well as with the single-compound octochloro copper phthalocyanine mentioned above, give economically superior pigments and exhibit advantageous brilliancy, lightfastness, and tinctorial values.

SUMMARY OF THE INVENTION

This invention relates to pigment compositions consisting essentially of solid solutions of
(a) about 90% to about 10% by weight of a chlorinated copper phthalocyanine containing about 14 to about 16 atoms of chlorine per molecule and having a chlorine content of about 47% to about 50% by weight, and
(b) about 10% to about 90% by weight of a chlorinated copper phthalocyanine containing about 3 to about 4 atoms of chlorine and having a chlorine content of about 15% to about 20% by weight,
wherein said pigment compositions are characterized by X-ray diffraction patterns that are different from the sum of the X-ray diffraction patterns of the individual phthalocyanine components.

DETAILED DESCRIPTION OF THE INVENTION

Figure 1:
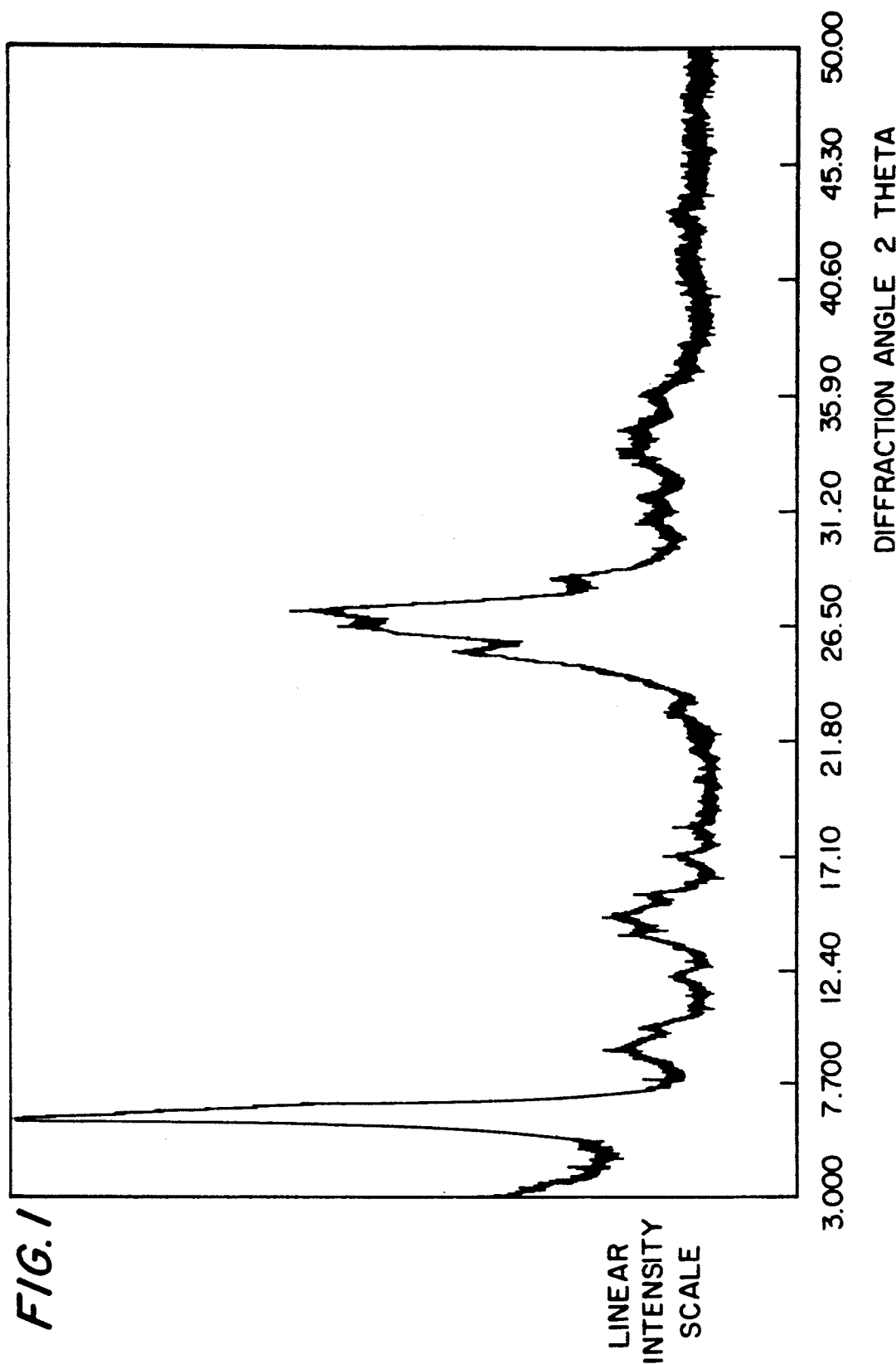
FIGS. 1, 3, and 4 show X-ray diffraction patterns of solid solutions of this invention having various relative amounts of the constituent components.

The solid solutions of the invention contain two components. The first component is a chlorinated copper phthalocyanine containing about 14 to about 16 atoms of chlorine per molecule (chlorine content of about 47% to about 50% by weight). This material is known and has been described, for example, in U.S. Pat. Nos. 2,247,752 and 2,549,842 and British Patent 932,943, and can also be obtained commercially, for example, from Aceto Chemical Co., American Tokyo Kasel Co., Inc., Pfalz and Bauer Co., Dainippon Ink and Chemicals, Inc. (Japan), and Toyo Ink, Inc. (Japan), as C.I. Pigment Green 7 (Colour Index 74260).

The second component of the solid solutions of the invention is a copper phthalocyanine containing about 3 to about 4 atoms of chlorine in the molecule (chlorine content of about 15% to about 20% by weight) and can be prepared, for example, by condensing 4-chlorophthalic acid or a salt thereof. A copper phthalocyanine having a chlorine content of less than 4 atoms per molecule can be prepared by substituting phthalic acid for part of the 4-chlorophthalic acid used in the condensation. This material is known and has been described, for example, in U.S. Pat. No. 3,300,512. A copper phthalocyanine containing about 4 atoms of chlorine can also be obtained commercially, for example, from Sanyo Color Works, Ltd. (Japan). As used herein, the general term "tetrachloro copper phthalocyanine" refers to the family of such products, regardless of their exact chlorine content.

The solid solutions of the invention contain C.I. Pigment Green 7 in combination with from about 10% to about 90% by weight (preferably 25% to 75% by weight) of a tetrachloro copper phthalocyanine and can be prepared by any of several methods, such as those described below, from physical mixtures of the individual components as starting materials. The proportions of the pigment components are generally not critical when it is not undesirable to have a portion of one or more of the components in admixture with the solid solution end product. It is preferred, however, to prepare pure products (that is, those which are substantially 100% solid solution) by adjusting the proportions so that all of the components can enter the same crystal lattice.

The solid solutions of this invention are prepared in such a way that a physical mixture of the two phthalocyanine components in the desired proportions is transformed into a solid solution. This transformation can be accomplished by milling processes or by treating the mixture with solvents, optionally at elevated temperatures. Suitable methods are described, for example, in British Patent 2,211,509 and European Patent Application 58,888.

Suitable milling procedures include dry-milling methods such as sand-milling, ball-milling, and the like, with or without additives, or wet-milling operations such as salt-kneading, bead-milling, and the like in water or organic solvents (such as alcohols or esters), with or without additives. After the milling step, an optional solvent treatment is preferably used, generally at temperatures between about 10° C. and about 200° C. This solvent treatment is preferably carried out at elevated temperatures, such as 60° C. to 145° C. Suitable solvents for these procedures include water; inorganic acids, such as sulfuric or phosphoric acid, adjusted to suitable strength; organic acids, such as formic or acetic acid; and various organic solvents such as alcohols (for example, methanol, ethanol, or ethylene glycol), ketones (for example, acetone or methyl ethyl ketone), aromatics (for example, toluene, xylene, chlorobenzene, nitrobenzene, or chloronaphthalene), esters (for example, methyl benzoate, dimethyl phthalate, or methyl salicylate), and amides (for example, formamide, dimethylformamide, or N-methylpyrrolidone). It is often advantageous to use mixtures of these solvents.

Suitable solvents for the direct conversion of physical mixtures into the solid solutions of this invention (that is, conversion without milling) preferably include inorganic acids such as sulfuric or phosphoric acid. The strength and quantity of acid can be adjusted so that both of the pigment components are dissolved. When using concentrated acids such as sulfuric acid, about 6 to 10 times by weight of acid relative to the quantity of pigment is typically used. The solid solution is precipitated from the acidic liquid solution by adding water ("acid pasting"). In an optional method, the acidity is adjusted in such a way that the starting components form acid salts, so that transformation to a solid solution occurs in suspension ("acid swelling"). Other suitable, but less preferred, solvents for such direct conversion include organic acids, such as formic or acetic acid; alcohols, such as methanol, ethanol, or ethylene glycol; ketones, such as acetone or methyl ethyl ketone; aromatics, such as toluene, xylene, chlorobenzene, nitrobenzene, or chloronaphthalene; esters, such as methyl benzoate, dimethyl phthalate, or methyl salicylate; and amides, such as formamide, dimethylformamide or N-methylpyrrolidone.

The solid solutions of the invention obtained by direct conversion can be after-treated using known methods. Such after-treatment can be carried out under conditions similar to those described above for the optional solvent treatment used after milling.

The tinctorial strength and transparency of the pigment can be affected by varying the after-treatment.

In a preferred milling procedure that is illustrative of the invention, Pigment Green 7 and a tetrachloro copper phthalocyanine are introduced into a ball mill and milled wet or dry to form a solid solution. The milling procedure is followed by treatment with methyl benzoate in a dilute water slurry, typically at 30° to 145° C. Use of methyl salicylate or dimethyl phthalate instead of methyl benzoate is also suitable. The ester solvent can then be hydrolyzed with dilute caustic. The resultant solid solution product is then collected, washed, and dried by methods known in the art.

In another preferred milling procedure illustrative of the invention, Pigment Green 7 and a tetrachloro copper phthalocyanine are added to water to make a slurry that is then passed through a bead mill containing, for example, glass or zirconium silicate beads spinning at high speed. The pigment slurry is separated from the beads and heated, typically at 30° to 145° C., before isolation.

In a preferred direct conversion procedure that is illustrative of the invention, Pigment Green 7 and a tetrachloro copper phthalocyanine are added to an excess (e.g., 10 parts by weight relative to the mixed pigments) of concentrated sulfuric acid and stirred, preferably at room temperature, until solution is complete. The solid solution can be precipitated by pouring the acidic liquid solution slowly into cold water with agitation. The resultant precipitate is filtered and preferably washed until free of acid. When using the acid precipitation method, it is generally preferred to carry out an after-treatment of the resultant presscake, for example, by preparing a slurry in water and heating, typically at 30° to 145° C., before isolation.

In another preferred direct conversion procedure illustrative of the invention, Pigment Green 7 and a tetrachloro copper phthalocyanine are added to 65 to 80% sulfuric acid, during which process the pigment is swelled. The swelled pigment can be precipitated by pouring into cold water with agitation. The resultant precipitate can be then be after-treated and isolated as described above.

Regardless of the particular method used for their preparation, the solid solution pigments of the invention are characterized by X-ray diffraction patterns that differ from the sum of the X-ray diffraction patterns of the individual phthalocyanine components. The diffraction angles ($2\theta$) of the individual components can, of course, be compared directly with those of solid solutions. The relative intensities (I) of peaks, however, cannot conveniently be summed. Therefore, instead of combining separately obtained X-ray diffraction patterns of the individual components, it is preferable to prepare an intimate physical mixture of the individual components in the appropriate relative amounts and to obtain an X-ray diffraction pattern of the resultant physical mixture. Changes in both diffraction angle and relative intensity can thus be more readily visualized.

Because of their light and migration fastness, solid solution phthalocyanine pigments of the invention are suitable for many different pigment applications. For instance, solid solution pigments of the invention can be used as the colorant (one of two or more colorants) for very fast pigmented systems, such as pigmented mixtures with other materials, pigment formulations, paints, printing ink, colored paper, or colored macromolecular materials. The term "mixtures with other materials" is understood to include, for example, mixtures with inorganic white pigments, such as titanium dioxide (rutile), or with cement. Examples of pigment formulations include flushed pastes with organic liquids or pastes and dispersions with water, dispersants, and, if appropriate, preservatives. Paints in which solid solutions of the invention can be used in any suitable paint vehicle include, for example, physically or oxidatively drying lacquers, storing enamels, reactive paints, two-component paints, solvent- or water-based system paints, emulsion paints for weatherproof coatings, metallic paints containing dispersed metallic particles, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; and those prepared synthetically, such as polymers, polyaddition products, and polycondensates. Examples of synthetically prepared macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the solid solution phthalocyanine pigments of the invention can have any desired shape or form.

The solid solution pigments of the invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing; give a very good tinctorial yield; and are readily dispersible, for example, in plastic materials.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

DESCRIPTION OF THE PREFERRED EMBODIMENTS

Pigments prepared according to the Examples were analyzed by X-ray diffraction using a Siemens D-5000 Spectrometer. Data were collected under the following conditions:

| | |
|---|---|
| Power: | 50 kV at 40 mA |

| -continued | |
|---|---|
| Slits: | 1.0 mm divergence |
| | 1.0 mm antiscatter |
| | 0.1 mm detector |
| Step size: | 0.01° |
| Step time: | 3 seconds |

EXAMPLE 1

50 Parts of a crude chlorinated copper phthalocyanine (C.I. Pigment Green 7) having a chlorine content of 48% by weight obtained from Dainippon Ink and Chemicals, Inc. (Japan), 50 parts of a copper phthalocyanine having a chlorine content of 16% by weight ("tetrachloro copper phthalocyanine") obtained from Sanyo Color Works, Ltd. (Japan), and a small amount of ethylene glycol were introduced into a ball mill containing 3000 parts of steel balls as grinding elements. The capacity of the ball mill was such that it was about 60% full when completely charged. The mill was rotated for 48 hours. The powder was discharged from the mill through a screen that retained the grinding elements. The ball-milled powder was added to water (4 times of the weight of the pigment) and stirred until thoroughly wet. The wetted powder was treated with methyl benzoate (80% by weight of the pigment powder), then heated to 100° C. and kept at that temperature for 12 hours. After the batch was cooled, the methyl benzoate was hydrolyzed using 50% aqueous sodium hydroxide at 90° C. for about 4 hours. The resultant mixture was cooled, filtered, washed with water, and dried to give a solid solution pigment exhibiting a brilliant turquoise hue.

FIG. 1 shows the X-ray diffraction spectrum of the solid solution pigment prepared according to Example 1.

EXAMPLE 2

Comparison

The same pigments as those used in Example 1 were separately milled and conditioned with methyl benzoate using the method described in Example 1. The individual pigments thus conditioned were then physically mixed in the same weight ratio as used in the solid solution prepared according to Example 1.

Figure 2:
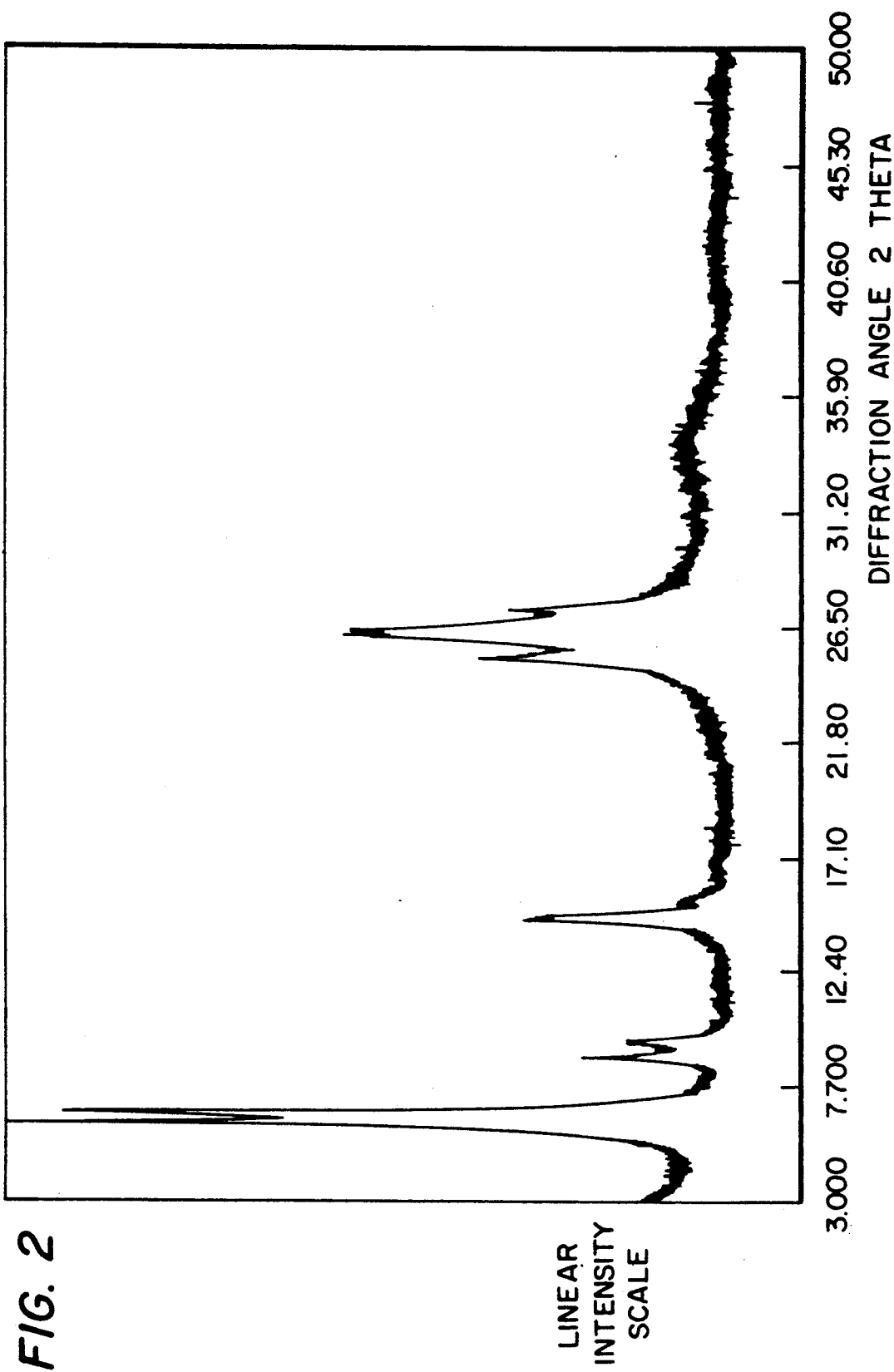
FIG. 2 shows an X-ray diffraction pattern of a physical mixture of the individual components used to prepare the solid solution having the X-ray diffraction pattern shown in FIG. 1.

FIG. 2 shows the X-ray diffraction pattern of the resultant physical mixture prepared according to comparison Example 2. The following differences between the X-ray diffraction patterns shown in FIGS. 1 and 2 show that the pigment of Example 1 is no longer simply a physical mixture of the individual components:

(a) Additional peaks for the solid solution at diffraction angle 2θ (relative intensity, I) of 12.2 (16), 13.9 (21), 17.1 (16), 23.1 (16), 28.4 (29), 30.9 (19), 31.7 (19), and 36.0 (20).

(b) Different intensity pattern, especially in the region where 2θ is 23–30.

(c) Peaks with shifted diffraction angle 2θ, e.g., from 9.5 (physical mixture) to 10.0 (solid solution).

(d) A single peak at 2θ of 6.1 (solid solution) instead of a double peak at 2θ of 6.3 and 6.7 (physical mixture). The merger of the double peak (attributable to the tetrachloro copper phthalocyanine component) to a single peak is characteristic of the solid solutions of the invention.

The differences in color properties between the solid solution of Example 1 and the corresponding physical mixture of Example 2 are summarized in the Table below.

EXAMPLE 3

25 Parts of crude Pigment Green 7 having a chlorine content of 48% by weight and 75 parts of a tetrachloro copper phthalocyanine having a chlorine content of 16% by weight were introduced into a ball mill as in Example 1. The mixture was milled and the resultant milled material was treated with methyl benzoate in a dilute water slurry. The batch was hydrolyzed with 50% aqueous sodium hydroxide, filtered, washed, and dried to give a pigment powder exhibiting a greenish-blue hue and having very good pigment properties.

Figure 3:
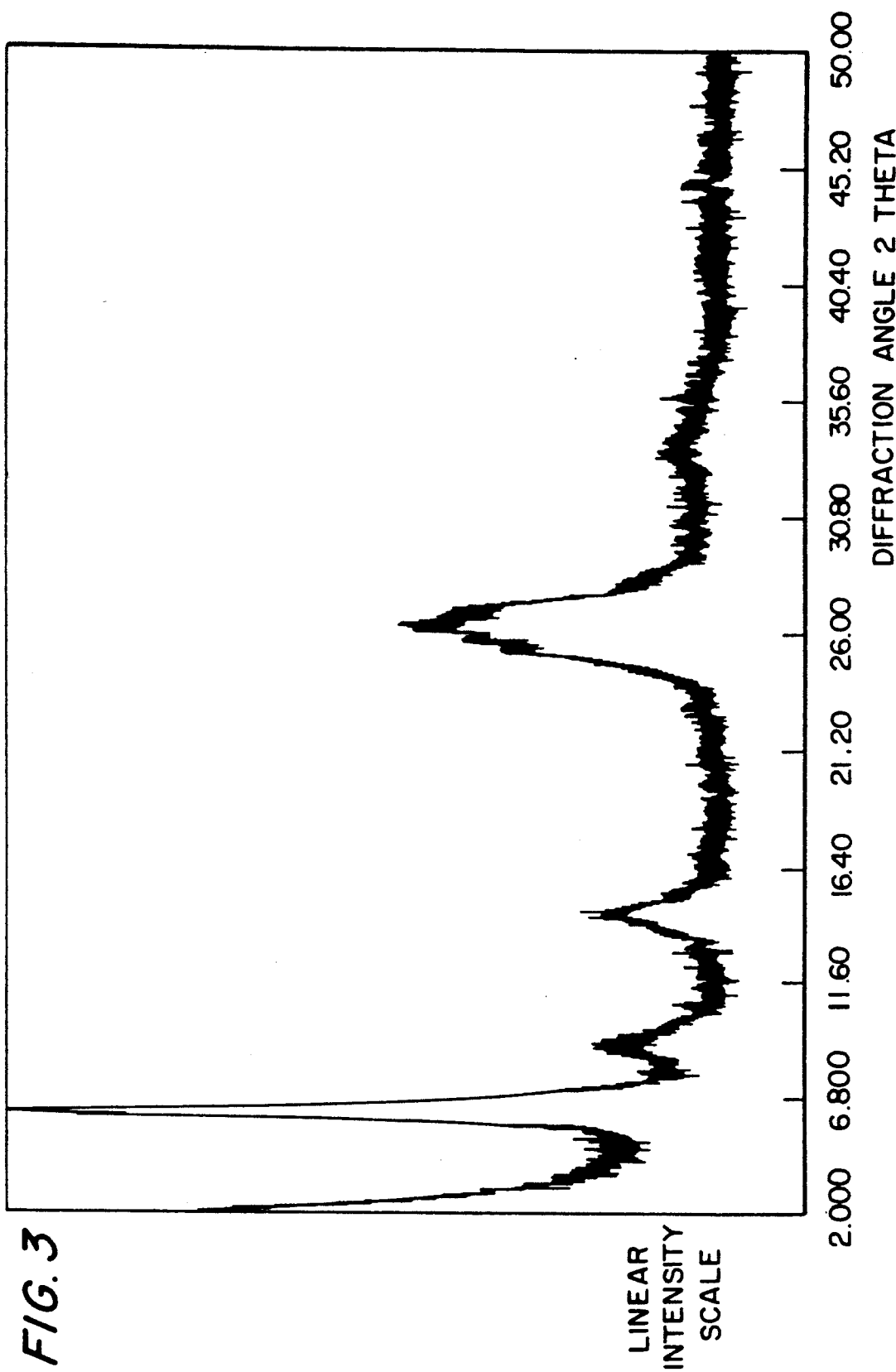

FIG. 3 shows an X-ray diffraction spectrum of the solid solution pigment prepared according to Example 3.

EXAMPLE 4

Comparison

Comparison Example 2 was repeated except for using the same weight ratio of pigments as used in the solid solution prepared according to Example 3.

The differences in color properties between the solid solution of Example 3 and the corresponding physical mixture of Example 4 are summarized in the Table below.

EXAMPLE 5

75 Parts of crude Pigment Green 7 having a chlorine content of 48% by weight and 25 parts of a tetrachloro copper phthalocyanine having a chlorine content of 16% by weight were introduced into a ball mill as in Example 1. The mixture was milled and the resultant milled material was treated with methyl benzoate in a dilute water slurry. The batch was hydrolyzed with 50% aqueous sodium hydroxide, filtered, washed, and dried to give a pigment powder exhibiting a greenish-blue hue and having very good pigment properties.

Figure 4:
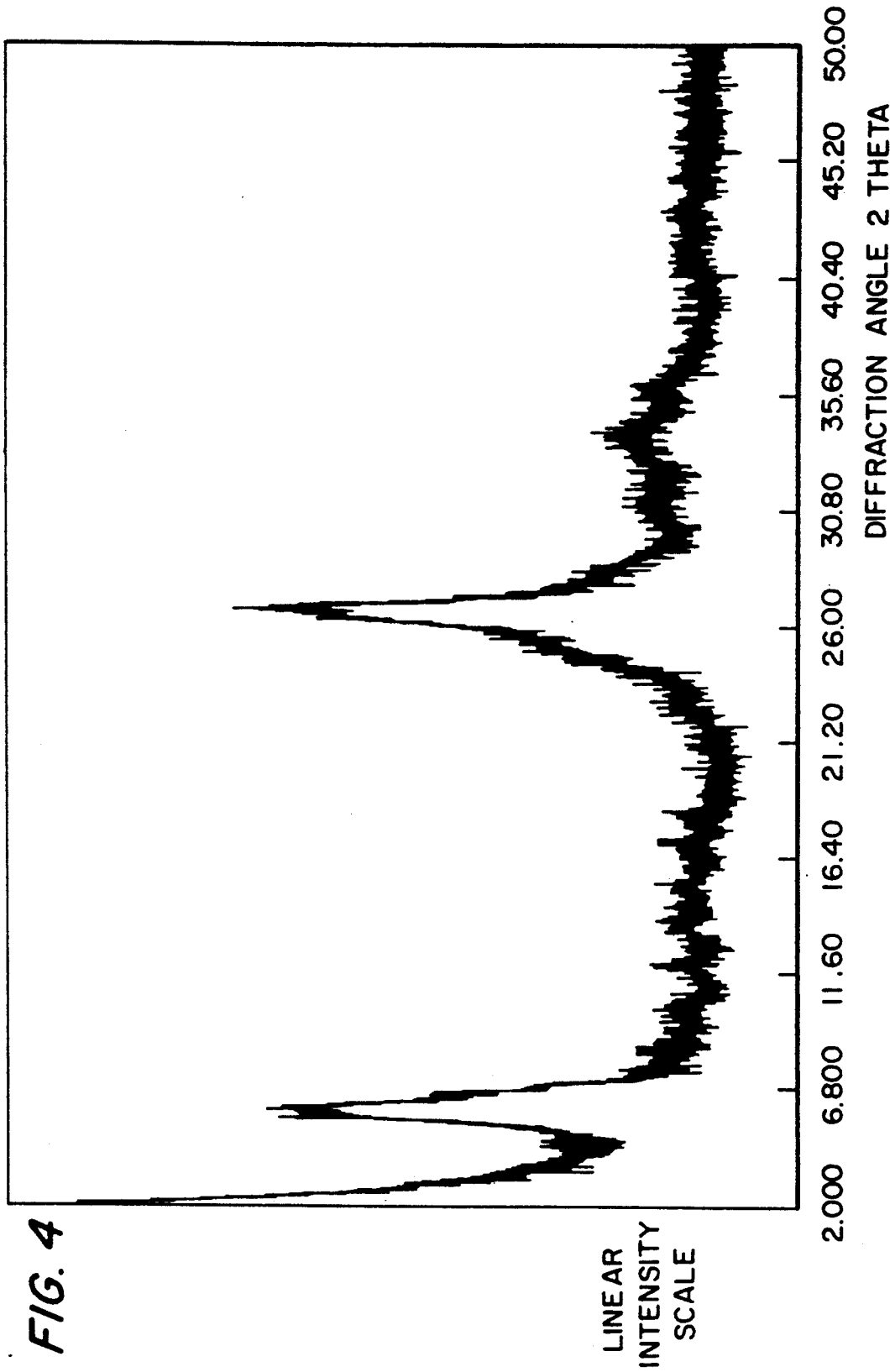

FIG. 4 shows an X-ray diffraction spectrum of the solid solution pigment prepared according to Example 3.

EXAMPLE 6

Comparison

Comparison Example 2 was repeated except for using the same weight ratio of pigments as used in the solid solution prepared according to Example 5.

The differences in color properties between the solid solution of Example 5 and the corresponding physical mixture of Example 6 are summarized in the Table below.

physical mixture. The deeper masstone is an advantage in paints, especially for metallic applications.

EXAMPLE 7

50 Parts of crude Pigment Green 7 having a chlorine content of 48% by weight and 50 parts of tetrachloro copper phthalocyanine having a chlorine content of 16% by weight were added to 1500 parts of 98-100% sulfuric acid and stirred at room temperature until the solution was complete. The solution was poured slowly into 20,000 parts of cold water with agitation, and the resultant precipitate was filtered and washed until free of acid. The presscake was slurried in 5000 parts of water, then heated at 125° C. for 4 hours, cooled, filtered, washed, and dried. The resultant powder exhibited a brilliant turquoise shade and had excellent light fastness.

EXAMPLE 8

50 Parts of crude Pigment Green 7 having a chlorine content of 48% by weight and 50 parts of tetrachloro copper phthalocyanine having a chlorine content of 16% by weight were added to 600 parts of 65% sulfuric acid. The pigment was allowed to swell for 24 hours at room temperature. The swelled pigment was poured into 20,000 parts of cold water with agitation, and the resultant precipitate was filtered and washed free of acid. The presscake was slurried in 5000 parts of water, then heated at 125°C. for 4 hours, cooled, filtered, washed, and dried. The resultant powder exhibited a turquoise shade.

EXAMPLE 9

50 Parts of crude Pigment Green 7 having a chlorine content of 48% by weight and 50 parts of tetrachloro copper phthalocyanine having a chlorine content of 16% by weight were added to 600 parts of sodium chloride and 120 parts of propylene glycol and kneaded in a heavy duty horizontal mixer. After being kneaded for 14 hours, the pigment-salt mixture was discharged from the mixer and washed with excess water to dissolve the salt. The pigment was filtered, washed, and dried to give a powder exhibiting a transparent turquoise shade and having very good pigment properties.

EXAMPLE 10

Octochloro Copper Phthalocyanine (Comparison)

A mixture of 80 g of monosodium dichlorophthalic acid obtained from Fluka Chemie AG (Switzerland) was stirred in 440 g of technical grade trichlorobenzene for 30 minutes and the resultant mixture was then stirred with 27 g of sulfuric anhydride for 4 hours at room

TABLE

Comparison of Color Properties of Solid Solutions and Corresponding Physical Mixtures

| Component proportions (P.G. 7 to Cl$_4$CuPc)[1] | Solid solution (Ex. no.) | Corresponding physical mixture (Ex. no.) | Mass tone[2] of solid solution relative to physical mixture | Undertone[3] ($\Delta$H) |
|---|---|---|---|---|
| 25:75 | 3 | 4 | Deeper | +3.91 (bluer) |
| 50:50 | 1 | 2 | Deeper | +3.47 (bluer) |
| 75:25 | 5 | 6 | Deeper | +1.23 (bluer) |

[1] "P.G. 7" represents Pigment Green 7 and "Cl$_4$CuPc" represents the tetrachloro copper phthalocyanine used in the Examples. Proportions are given in parts by weight.
[2] Mass tone (pigment color depth) differences were evaluated visually.
[3] Undertone differences in hue were measured using an Applied Color System Spectral Sensor obtained from Hunt Associated Laboratories (Fairfax, Virginia).

Each solid solution listed in the Table exhibits a bluer hue and a deeper mass tone than the corresponding temperature. Molybdic anhydride (3.0 g) was added the mixture was heated to 100° C., after which 120 g of urea and 9.6 g of copper(1) chloride were added. The mixture was heated slowly to 185 C and held at that temperature for an additional 6 hours. The reaction mixture was cooled to 100° C., filtered, and washed with methanol. The resultant material was slurried in 1 liter of water containing 100 g of 50% aqueous sodium hydroxide and heated at 85 C for 2.5 hours. The slurry was filtered and washed with hot water and then reslurried with 1 liter of water containing hydrochloric acid. The solid was filtered, washed with water, and dried to give octochloro copper phthalocyanine.

This material was bluer and duller than the turquoise solid solution pigment the invention, despite having approximately the content.

EXAMPLE 11

Preparation of Enamel Paints

A finely divided 8 g sample of the pigment of Example 1 was dispersed in 92 g of a stoving enamel having the following composition:

| | |
|---|---|
| 33% | AROPLAZ ® 1453-X-50 alkyd resin (available from Reichhold Chemicals, Inc., White Plains, New York) |
| 15% | RESIMENE ® BM-7507 melamine resin (available from Monsanto Company, St. Louis, Missouri) |
| 5% | glycol monomethyl ester |
| 34% | xylene |
| 13% | butanol |

Upon completion of the dispersion the pigmented paint was applied to metal foils. The coated samples were then baked at 130° C. for 30 minutes. The coatings were very fast to light and weathering and had good over-lacquering fastness.

Other suitable alkyd resins are products based on synthetic or vegetable fatty acids, such as coconut oil, castor oil, ricinene oil, linseed oil, or the like. Urea resins can be used instead of melamine resins.

EXAMPLE 12

Preparation of Thermoplastic Moldings

A 0.2 g sample of the pigment of Example 1 was dispersed in 65 g of stabilized PVC and 35 g of diisooctyl phthalate at 160° C. in a mixing mill and then milled at that temperature. A turquoise-colored film of very good fastness to light and migration was obtained.

Synthetic polyamides of caprolactam or of adipic acid and hexamethylenediamine or the polyester condensates of terephthalic acid and ethylene glycol are colored in a similar manner at 280°–300° C. (in an atmosphere of nitrogen where necessary).

EXAMPLE 13

Preparation of a Printing Ink

A printing ink was prepared by grinding 35 g of the pigment of Example 1, 65 g of linseed oil, and 1 g of a siccative (cobalt naphthenate, 50% strength in white spirit). The printing ink gave bluish-green offset prints on paper exhibiting high brilliance and tinctorial strength and having very good light and lacquering fastness properties.

EXAMPLE 14

Preparation of a Metallic Paint

A mixture of 6 g of the pigment of Example 1 in 12 g of xylene, 4.1 g of butyl acetate, 0.7 g of butanol, and 22.5 g of a 20% solution of cellulose acetobutyrate in 2:1 butyl acetate/xylene were dispersed in a shaker containing 2 to 3 mm diameter glass beads. To this dispersion was then added 10 g of a saturated polyester resin (available as DYNAPOL ® H 700 from Huls America), 7.3 g of melamine resin, 8.7 g of a 20% solution of cellulose acetobutyrate in 2:1 butyl acetate/xylene, 18 g of butyl acetate, 1.6 g of butanol, and 9.7 g of xylene and shaking was continued for another 5 minutes.

Metallic paints were then prepared by adding a dispersion of aluminum paste (60%; available as SPARKLE SILVER ® 5000 AR from Silberline Manufacturing Co., Inc.) in xylene (about 1:2) in amounts such that the ratio of pigment to aluminum was between about 80:12 and 1:99.

What is claimed is:

1. A pigment composition consisting essentially of a solid solution of
   (a) 90% to 10% by weight of a chlorinated copper phthalocyanine containing 14 to 16 atoms of chlorine per molecule and having a chlorine content of 47% to 50% by weight, and
   (b) 10% to 90% by weight of a chlorinated copper phthalocyanine containing 3 to 4 atoms of chlorine and having a chlorine content of 15% to 20% by weight, wherein said pigment composition is characterized by an X-ray diffraction pattern that is different from the sum of the X-ray diffraction pattern of the individual phthalocyanine components.

2. A pigment composition according to claim 1 wherein 75% to 25% by weight of component (a) and 25% to 75% by weight of component (b) are used.

3. A pigment composition according to claim 1 wherein component (a) has a chlorine content of 48% by weight.

4. A pigment composition according to claim 1 wherein the component (b) has a chlorine content of 16% by weight.

5. A colored macromolecular material containing a colorant wherein said colorant comprises a pigment composition of claim 1.

6. A paint containing a colorant wherein said colorant comprises a pigment composition of claim 1.

7. A metallic paint containing a colorant and dispersed metallic particles wherein said colorant comprises a pigment composition of claim 1.

* * * * *